Oct. 11, 1938.                C. E. RIDGWAY                2,133,041
                    PROTECTIVE COLLAR FOR FRUIT BOXES
                           Filed April 9, 1938
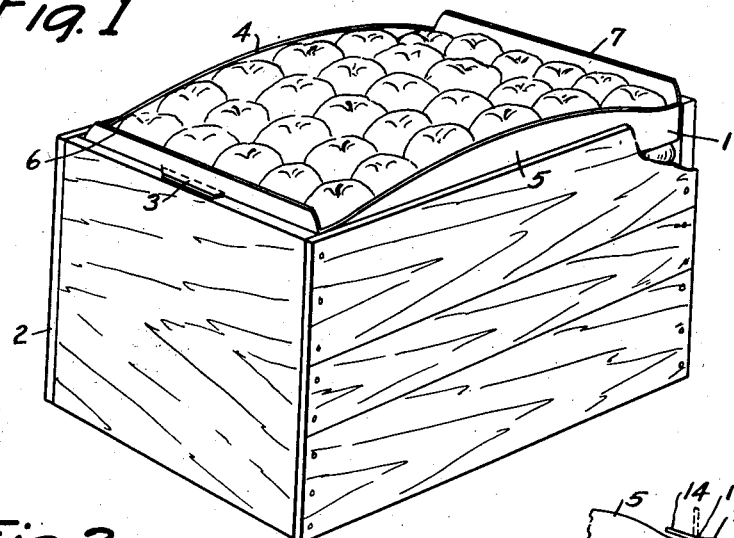
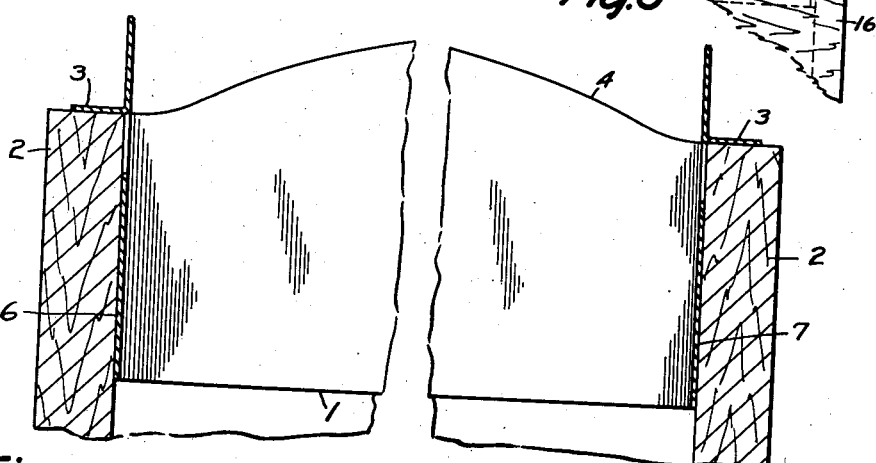
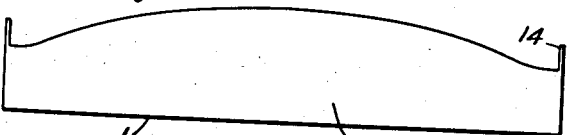
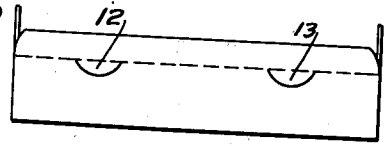
INVENTOR.
Carl E. Ridgway
BY James Harrison Bowen
ATTORNEY.

Patented Oct. 11, 1938

2,133,041

UNITED STATES PATENT OFFICE 2,133,041

PROTECTIVE COLLAR FOR FRUIT BOXES

Carl E. Ridgway, Seattle, Wash.

Application April 9, 1938, Serial No. 201,024

1 Claim. (Cl. 217—3)

The purpose of this invention is to provide an improvement in the means for supporting collars around the upper edges of fruit boxes or containers where fruit, such as apples, pears and the like, is packed with the upper layer bulging; in which the collar is supported at points intermediate of the ends where irregularities in the widths of containers makes it unsatisfactory to use collars supported at the corners.

The invention is a collar in the form of a strip of cardboard, pasteboard, or relatively thick paper, extending around and fitting snugly on the inside of the open end of a box, with parts extending upward above the edge of the box for protecting the fruit rolling off of the top of the container while packing and before the lid is applied; in which flaps are cut from the ends and adapted to be folded outward, forming positive supports for the collar.

This invention is an improvement over a similar collar described in Patent Number 1,885,589 assigned to Carl E. Ridgway by an assignment recorded in the Patent Office April 7, 1936, Liber K 167—pages 330 and 331, in that, whereas the collar of the above patent was supported by shoulders at the corners, this collar is supported by flaps stamped from the ends, located about midway of the ends, and adapted to fold outward, forming a positive support along substantial portions of the ends; the shoulders at the corners having been found unsatisfactory for certain fruits, and particularly for grape crates or lugs, because they are relatively thin and comparatively small.

The object of this invention is, therefore, to provide a collar adapted to fit snugly around the inside of the open end of a fruit box or container which is adapted for various types of fruits.

Another object is to provide a collar of the type described, in which positive means is provided at the ends for supporting the collar.

Another object is to provide improvements in means for supporting collars in the open ends of fruit boxes during the filling and lidding operations which compensates for containers of different widths.

A further object is to provide means for supporting collars around the interior of the open ends of fruit boxes and the like which supports the collar from the ends, and extends over a major portion thereof.

And a still further object is to provide positive means for supporting collars in the open ends of fruit boxes which increases the bearing area, and which is of a simple and economical construction.

With these ends in view the invention embodies a collar formed of a relatively narrow continuous strip of material shaped to form a rectangle and adapted to fit snugly against the inner surfaces of the sides and ends of a box or container, with the upper edges of the sides curved being higher in the centers, and with the ends provided with an extended flap and a smaller flap cut in the ends and adapted to be bent outward to rest upon the upper edges of the ends of the box or container.

Other features and advantages of the invention will appear from the following description taken in connection with the drawing, wherein:

Figure 1 is a view showing the collar as it would appear in use.

Figure 2 is a longitudinal section through a box similar to an apple box, with the collar in place and with the fruit omitted.

Figure 3 is a detail showing an alternate design in which the extending flaps rest upon cleats on the ends of the boxes or crates which are particularly adapted for grape crates or lugs.

Figure 4 is an end view of the collar.

Figure 5 is a view showing a side elevation of the collar.

Figure 6 is a view similar to that shown in Figure 3, showing an alternate design, in which a plurality of flaps is provided in the end instead of the single flap shown in Figure 3.

In the drawing the collar is shown as it may be made, wherein numeral 1 indicates the strip of material forming the collar, numeral 2, a box or container, and numeral 3, the flaps at the ends of the collar which provide the supporting means. The collar 1 is formed with sides 4 and 5 and ends 6 and 7, and the flaps 3 are cut from the ends on the lines 8, 9 and 10 as shown in Figure 3, with the upper or folding edge of the flap on a folded line 11 extending across both of the ends 6 and 7, and positioned to correspond substantially with the upper edge of the box, or, where cleats are used as shown in Figure 3, the flaps 3 rest upon the cleats, and the sides of the collar are elevated slightly above the upper edge of the box, crate or lug. The sides 4 and 5 are curved upward from the line 11 so that they extend upward above the edges of the box as shown in Figure 1.

Although only one flap 3 is shown in each end of the box, it will be understood that any number of flaps may be used, and in Figure 5 two flaps 12 and 13 are illustrated, and these may be semicircular or shaped as shown in Figure 3, or of any shape, and it will be understood that any number of flaps may be used.

This collar may, therefore, be used with various kinds of fruits, and the flaps may rest upon the ends of the box as shown in Figures 1 and 2, or upon cleats at the ends as shown in Figure 3, and, when the cover is applied, the upper edges, as indicated by the numeral 14, of the ends 6 and 7 are bent inward on the line 11, protecting the fruit from the cover, and, when the cover is applied, the sides 4 and 5 are also bent inward, preventing the fruit being exposed, which is particularly advantageous for packing grapes because truck drivers and clerks try to pull the grapes through the bulging edges, not only bruising and breaking part of the grapes but these bruised grapes spoil the entire bunch.

It will be understood that other changes may be made in the collar without departing from the spirit of the invention. One of which changes may be in the relative widths of the sides and ends in comparison to the size of the collar, another may be in the use of any other material, and another may be in the use of other means for providing rests or stops projecting from the ends to rest upon the ends of the box or container.

The construction will be readily understood from the foregoing description. In use these collars may be provided as shown and described, and it will be noted that they may be supplied in the flat position, folded at the corners, and, when it is desired to set them up, they may be opened to the position shown in Figures 3 and 4, and placed in the upper or open end of the box, with the curved sides and extending parts of the ends extending upward above the sides of the box, and, as the collar is inserted, the flaps 3 may be pressed outward so that they will rest upon the upper edges of the ends, as shown in Figure 1, or upon the cleats as shown in Figure 3. With the supporting means formed in this manner, the collars are positively supported by a substantial piece of material, whereas the thin extending ends or shoulders of the collars of the patent bend, tear and slip off of the sides of the box, permitting the collars to drop downward inside while fruit is being placed therein. The ends of the collar also fit snugly against the ends of the box, and any projection extending along the ends, therefore, provides positive supporting means so that this improved supporting means makes it possible to insure the operators that the collars will remain in position.

Having thus fully described the invention, what I claim as new, and desire to secure by Letters Patent, is:

A fruit protecting collar for the upper filling ends of fruit packing boxes, cases, cartons, and the like, of the type comprising an endless vertically positioned collar of less depth than the depth of the box fitting snugly around and in engagement with the inner surfaces of the four sides of the box and having fruit protecting zones projecting above the edge of the box on all four sides; comprising a flat strip of material positioned with part extending downward inside of the box and the parts forming the fruit protecting zones extending upward, and with the parts at the ends of the box scored across the ends at points corresponding with the upper edge of the box with the parts forming the said fruit protecting zones at the ends thereby hinged, and adapted to fold inward as a cover is applied to the box protecting the fruit from the cover; and supporting hinged tabs struck from the parts of the ends of the collar extending downward inside of the box also scored and having their hinges formed thereby coincident with the aforesaid score, and adapted to fold outward at the points corresponding with the upper edge of the box, forming bearing surfaces to engage the top edge and outside of the ends of the box.

CARL E. RIDGWAY.